(12) United States Patent
Yang

(10) Patent No.: US 10,439,326 B2
(45) Date of Patent: Oct. 8, 2019

(54) BUTTON STRUCTURE AND TERMINAL APPLYING SAME

(71) Applicant: SHENZHEN ROYOLE TECHNOLOGIES CO. LTD., Shenzhen (CN)

(72) Inventor: Fan Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 15/539,377

(22) PCT Filed: Dec. 25, 2014

(86) PCT No.: PCT/CN2014/094959
§ 371 (c)(1),
(2) Date: Jun. 23, 2017

(87) PCT Pub. No.: WO2016/101210
PCT Pub. Date: Jun. 30, 2016

(65) Prior Publication Data
US 2018/0013244 A1   Jan. 11, 2018

(51) Int. Cl.
*H01R 13/631* (2006.01)
*H01H 13/14* (2006.01)
(Continued)

(52) U.S. Cl.
CPC ......... *H01R 13/6315* (2013.01); *H01H 13/14* (2013.01); *H01H 13/52* (2013.01);
(Continued)

(58) Field of Classification Search
CPC .... H01H 13/70; H01H 13/702; H01H 13/705; G06F 3/016; H01R 13/6315
(Continued)

(56) References Cited

U.S. PATENT DOCUMENTS

| | | | | |
|---|---|---|---|---|
| 4,034,176 A * | 7/1977 | Larson | ................. | H01H 13/702 200/5 A |
| 5,536,911 A * | 7/1996 | Madill | ................. | H01H 25/041 200/5 A |
| 5,546,457 A * | 8/1996 | Tomura | ................... | H04M 1/22 379/368 |
| 6,262,378 B1 * | 7/2001 | Chou | ................... | H01H 19/585 200/18 |
| 6,303,887 B1 * | 10/2001 | Ando | ................... | H01H 13/702 200/1 B |

(Continued)

FOREIGN PATENT DOCUMENTS

| JP | 4-82173 A | 3/1992 |
|---|---|---|
| WO | 2014084293 A1 | 6/2014 |

*Primary Examiner* — Edwin A. Leon
*Assistant Examiner* — Matthew T Dzierzynski
(74) *Attorney, Agent, or Firm* — Hauptman Ham, LLP

(57) ABSTRACT

A button structure and a terminal using the same are provided. The button structure includes a connecting element, a press element, and at least one elastic element connected to the connecting element and the press element. The elastic element is configured to provide a restoring force after the press element is pressed toward the connecting element. The connecting element is provided with an instruction transmission port and at least one of a current transmission port and a data transmission port. The press element is provided with an instruction triggering port and at least one of a current transmission pin and a data transmission pin. The current transmission pin is electrically connected to the current transmission port to output or input current. The data transmission pin is electrically connected to the data transmission port to output or input data.

5 Claims, 10 Drawing Sheets

(51) Int. Cl.
*H01H 13/52* (2006.01)
*H01R 13/24* (2006.01)
*H01R 13/703* (2006.01)
*H01H 13/81* (2006.01)
*H01R 12/77* (2011.01)
*H01R 13/453* (2006.01)
*H01R 13/64* (2006.01)
*H04M 1/23* (2006.01)
*H01H 13/705* (2006.01)
*H01H 13/78* (2006.01)

(52) U.S. Cl.
CPC ............. *H01H 13/81* (2013.01); *H01R 13/24* (2013.01); *H01R 13/7035* (2013.01); *H01H 13/705* (2013.01); *H01H 13/78* (2013.01); *H01H 2207/022* (2013.01); *H01H 2221/044* (2013.01); *H01H 2225/002* (2013.01); *H01H 2225/018* (2013.01); *H01H 2235/00* (2013.01); *H01R 12/77* (2013.01); *H01R 13/4538* (2013.01); *H01R 13/64* (2013.01); *H04M 1/23* (2013.01)

(58) Field of Classification Search
USPC .................. 200/5 A, 18, 314, 341, 512, 562
See application file for complete search history.

(56) References Cited

U.S. PATENT DOCUMENTS

| | | | | |
|---|---|---|---|---|
| 6,525,279 | B2 * | 2/2003 | Sato | H01H 25/041 200/18 |
| 6,680,676 | B1 * | 1/2004 | Hayashi | H04M 1/0202 200/244 |
| 6,763,245 | B1 * | 7/2004 | Satoh | H04M 1/0202 379/433.06 |
| 8,545,247 | B2 * | 10/2013 | Aldana | H01R 13/6315 439/248 |
| 9,362,668 | B2 * | 6/2016 | Wang | G06F 1/1656 |
| 9,450,362 | B2 * | 9/2016 | Wang | H01R 31/06 |
| 9,559,456 | B2 * | 1/2017 | Harmon | H01R 13/6205 |
| 2005/0259081 | A1 * | 11/2005 | Sato | G06F 1/1626 345/169 |
| 2006/0146027 | A1 * | 7/2006 | Tracy | G06F 3/0238 345/168 |
| 2006/0204303 | A1 * | 9/2006 | Yurochko | G06F 3/0202 400/49 |
| 2009/0111320 | A1 * | 4/2009 | Johansson | H01R 13/24 439/466 |
| 2013/0114199 | A1 * | 5/2013 | Jung | H01H 13/702 361/679.09 |
| 2017/0336880 | A1 * | 11/2017 | Wakuda | G06F 3/0338 |
| 2017/0351339 | A1 * | 12/2017 | Kawaguchi | G06F 3/02 |

\* cited by examiner

US 10,439,326 B2

BUTTON STRUCTURE AND TERMINAL APPLYING SAME

TECHNICAL FIELD

The present disclosure relates to the field of terminals, and more particularly to a button structure and a terminal using the same.

BACKGROUND

Presently, many terminals are provided with buttons. The buttons only have button function, and can be only used to close or cut off a circuit to achieve an instruction transmission function. The buttons have a single function, and take too much structural space of the terminals. Furthermore, presently, many terminals not only need buttons, but also need a power access function or a power output function, or a data input function and a data output function. For example, the terminals may be mobile phones, computers, mobile power packs, mobile storage devices, and so on. Generally, the terminal may be provided with a universal serial bus (USB) interface which may be used to transmit both power and data. However, it is usually complex to have an interface like the USB interface to be provided on the terminal, the space of the terminal is occupied, and the appearance of the terminal is also affected. Moreover, the interface is exposed to the outside of the terminal, thus dust or impurities are easy to enter the inside of the terminal, which affects the service life of the terminal. However, at present, no button structure can both meet requirements of various functions of the terminal and also save the structural space of the terminal.

SUMMARY

The present disclosure aims to provide a button structure for realizing various functions and a terminal using the same.

In order to solve the above technical problem, the present disclosure provides a button structure. The button structure includes a connecting element, a press element, and at least one elastic element connected to the connecting element and the press element. The at least one elastic element is configured to provide a restoring force after the press element is pressed towards the connecting element. The connecting element is provided with an instruction transmission port and at least one of a current transmission port and a data transmission port. The press element is provided with an instruction triggering port and at least one of a current transmission pin and a data transmission pin. The current transmission pin is electrically connected to the current transmission port to output or input current. The data transmission pin is electrically connected to the data transmission port to output or input data. When the press element is pressed towards the connecting element, the instruction triggering port comes into contact with the instruction transmission port to trigger instruction transmission.

The present disclosure also provides a terminal. The terminal includes the above button structure. The terminal further includes a housing. The housing defines a receiving cavity. The connecting element is fixed in the receiving cavity, and the press element is exposed out of the receiving cavity.

For the button structure and the terminal using the button structure of the present disclosure, by means of electrical connection between the current transmission pin of the press element and the current transmission port of the connecting element, the current output or input function of the button structure can be realized. By means of electrical connection between the data transmission pin of the press element and the data transmission port of the connecting element, the data output or input function of the button structure can be realized. Also, after the press element is pressed towards the connecting element, the instruction triggering port comes into contact with the instruction transmission port, the instruction transmission function of the button structure is realized, thus the button structure can meet the requirements of various functions.

BRIEF DESCRIPTION OF THE DRAWINGS

In order to illustrate the technical solutions of the embodiments of the present disclosure more clearly, the drawings used in the description of the embodiments will be briefly described. It will be apparent that the drawings described in the following are some embodiments of the present disclosure, and it will be apparent to those skilled in the art that other drawings can be obtained from the drawings without any creative effort.

DETAILED DESCRIPTION OF ILLUSTRATED EMBODIMENTS

Technical solutions of embodiments of the present disclosure are described clearly and completely below in combination with the accompanying drawings of the embodiments of the present disclosure.

Figure 1:
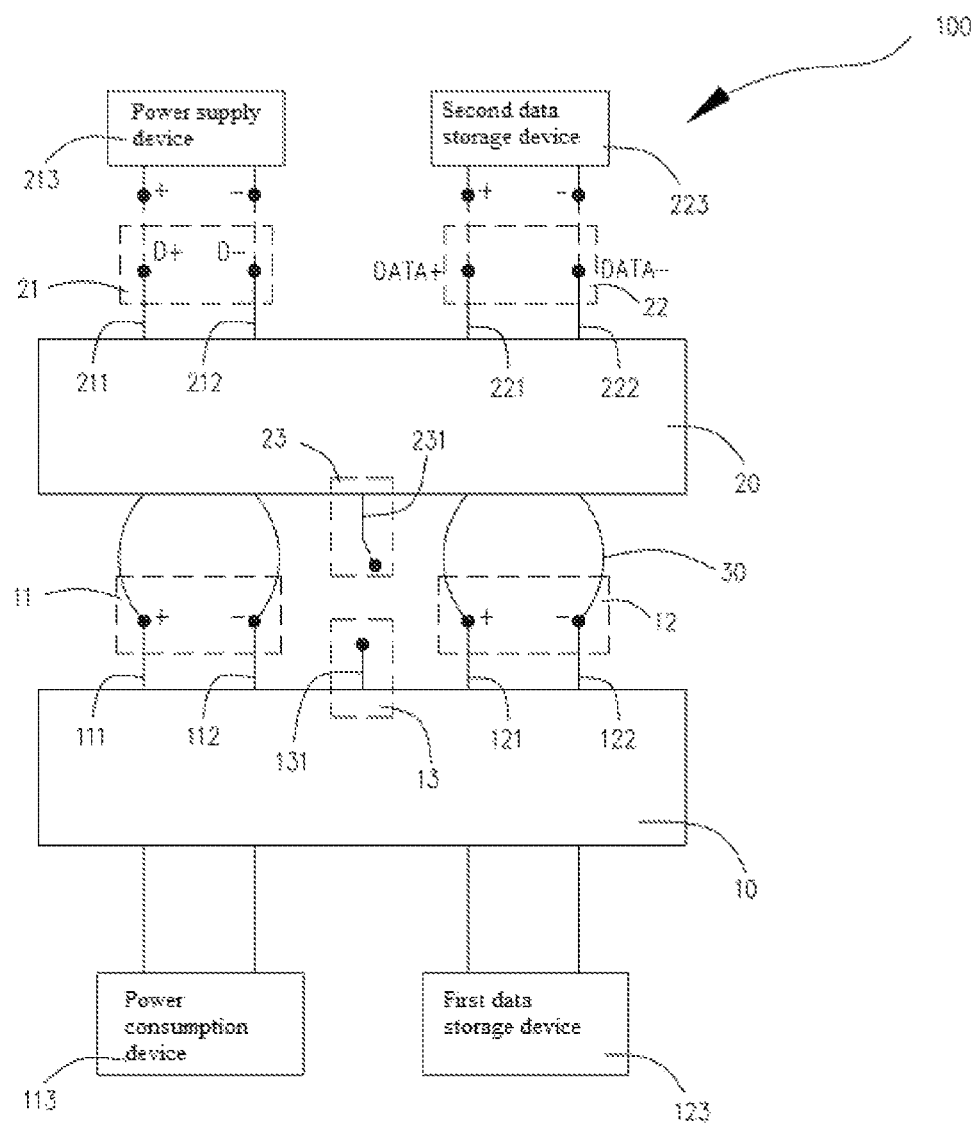
FIG. 1 is a schematic view of a button structure according to a first embodiment of the present disclosure.
Figure 2:
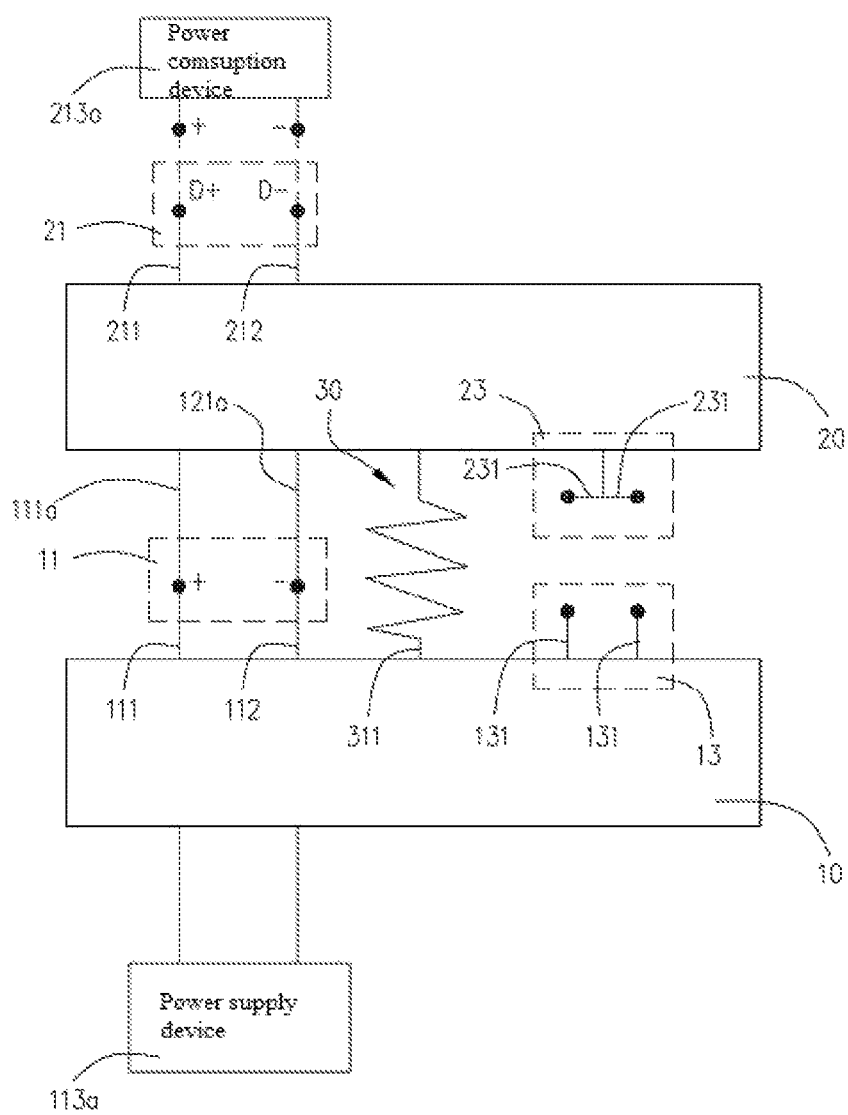
FIG. 2 is a schematic view of a button structure according to a second embodiment of the present disclosure.
Figure 3:
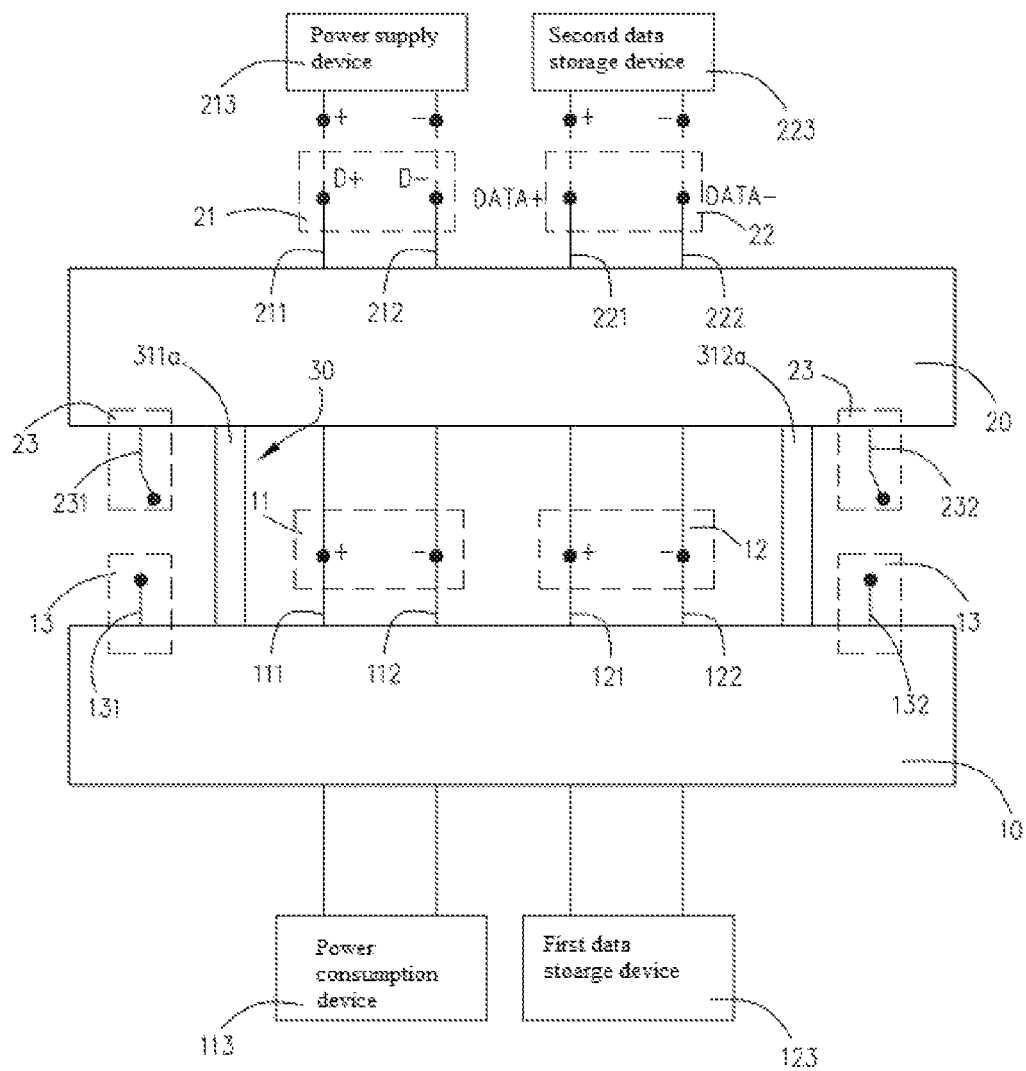
FIG. 3 is a schematic view of a button structure according to a third embodiment of the present disclosure.

Referring to FIGS. 1-3, a first embodiment of the present disclosure provides a button structure 100.

The button structure 100 includes a connecting element 10, a press element 20, and at least one elastic element 30 connected to the connecting element 10 and the press element 20. The at least one elastic element 30 is configured to provide a restoring force when the press element 20 is pressed towards the connecting element 10. The connecting element 10 is provided with at least one of a current transmission port 11 and a data transmission port 12, and an instruction transmission port 13. The press element 20 is provided with at least one of a current transmission pin 21 and a data transmission pin 22, and an instruction triggering port 23. The current transmission pin 21 is electrically connected to the current transmission port 11 to output or input current. The data transmission pin 22 is electrically connected to the data transmission port 12 to output or input data. After the press element 20 is pressed towards the connecting element 10, the instruction triggering port 23 comes into contact with the instruction transmission port 13 to trigger instruction transmission.

By means of electrical connection between the current transmission pin 21 of the press element 20 and the current transmission port 11 of the connecting element 10, the current output or input function of the button structure 100 can be realized. By means of electrical connection between the data transmission pin 22 of the press element 20 and the data transmission port 12 of the connecting element 10, the data output or input function of the button structure 100 can be realized. Also, after the press element 20 is pressed towards the connecting element 10, the instruction triggering port 23 comes into contact with the instruction transmission port 13, the instruction transmission function of the button structure 100 is realized, thus the button structure 100 can meet the requirements of various functions.

In this embodiment, the connecting element 10 is an integrated circuit board. The connecting element 10 is provided with at least one of a current transmission circuit and a data transmission circuit, and an instruction transmission circuit. As a preferred embodiment, the connecting element 10 is provided with both the current transmission circuit and the data transmission circuit, and the instruction transmission circuit, that is, the connecting element 10 can acquire current from a power source to supply the current to various electrical devices or supply the current from the power source to an electrical device. The connecting element 10 can also input data to a data storage device or acquire data from the data storage device, and the connecting element 10 can transmit instructions to a central processing unit. It is to be understood that the connecting element 10 may be used in a terminal, such as a mobile phone, a tablet computer, an electronic album, a music player, or the like. The current transmission port 11, the data transmission port 12, and the instruction transmission port 13 are arranged in the current transmission circuit, the data transmission circuit, and the instruction transmission circuit correspondingly and respectively. The connecting element 10 can charge the terminal by connecting the current transmission port 11 to a power source, can transmit a variety of music data, image data, sound data or the like to the terminal by connecting the data transmission port 12 to a storage device, and can transmit switch instructions, volume adjustment instructions, brightness adjustment instruction or the like to the terminal via the instruction transmission port 13.

In other embodiments, the connecting element 10 also may include only the current transmission port 11 and the instruction transmission port 13. For example, the connecting element 10 is used in a mobile power pack. The connecting element 10 can transmit the electricity of the mobile power pack to a mobile phone, or a tablet computer, and the connecting element 10 can also transmit a closing instruction, an open instruction, or an electricity display instruction to the mobile power pack. The connecting element 10 may also include only the data transmission port 12 and the instruction transmission port 13, for example, the connecting element 10 is used in a flash memory device.

In this embodiment, the press element 20 can be connected to the power source and/or the data storage device via the current transmission pin 21 and/or the data transmission pin 22. It is to be understood that the press element 20 can be connected to the power source and/or the data storage device via a data line having a USB connector, so as to realize the function of charging the terminal and/or data transmission. Specifically, the press element 20 includes the current transmission pin 21 and the data transmission pin 22. The current transmission pin 21 and the data transmission pin 22 can be electrically connected to the current transmission port 11 and the data transmission port 12 directly via a conductor, or can be coupled to the current transmission port 11 and the data transmission port 12. In other embodiments, if the connecting element 10 includes only the current transmission port 11 and the instruction transmission port 13, or only the data transmission port 12 and the instruction transmission port 13, the press element 20 may also include only the current transmission pin 21 and the instruction triggering port 23, or only the data transmission pin 22 and the instruction triggering port 23.

In the present embodiment, the press element 20 is arranged with respect to the connecting element 10, and can get close to or far away from the connecting element 10. When the press element 20 gets far away from the connecting element 10, the instruction triggering port 23 is not in contact with the instruction transmission port 13, thus the instruction transmission circuit of the connecting element 10 is in an open state. At this point, the button structure 100 does not transmit an instruction to the terminal, and the operating state of the terminal does not change. When the press element 20 gets close to the connecting element 10, the instruction triggering port 23 comes into contact with the instruction transmission port 13, thus the instruction transmission circuit of the connecting element 10 is in a closed state, so as to trigger instruction transmission to the terminal, and change the operating state of the terminal. It is to be understood that the press element 20 may be a power button of the terminal. By pressing the press element 20, the terminal can control the power source, such as, control power supply or interruption of power supply of the power source.

Furthermore, the current transmission port 11 includes a first anode 111 and a first cathode 112. The current transmission pin 21 includes a first positive pin 211 and a first negative pin 212. The first positive pin 211 is connected to the first anode 111, and the first negative pin 212 is connected to the first cathode 112.

In the implementation manner, the first embodiment is provided. Referring to FIG. 1, the first anode 111 and the first cathode 112 can be connected to an anode and a cathode of a power consumption device 113 correspondingly, and the first anode 111 and the first cathode 112 can be used to input current to the power consumption device 113. The first positive pin 211 and the first negative pin 212 of the current transmission pin 21 can be connected to an anode and a cathode of a power supply device 213 correspondingly. The first anode 111 and the first cathode 112 of the current transmission port 11 are connected to the anode and cathode of the power supply device 213 correspondingly via the first positive pin 211 and the first negative pin 212, thus the first anode 111 and the first cathode 112 are enabled to be connected to the power supply device 213, and the electricity of the power supply device 213 is transmitted to the power consumption device 113 via the first anode 111 and the first cathode 112. It is to be understood that the power consumption device 113 may be electronic components of the terminal, for example, a display screen, a central processing unit, a speaker, a built-in battery, and so on. The first positive pin 211 and the first negative pin 212 may be a D+ and D− pin of the USB interface respectively, and the power supply device 213 may be a power source, for example, a mobile power pack, a power socket connected to a power grid, a battery, and so on. In other embodiments, the current transmission pin 21 may also include a ground pin, the current transmission port 11 may also include a ground electrode, and the ground electrode is electrically connected to the ground pin.

Furthermore, the data transmission port 12 includes a second anode 121 and a second cathode 122. The data transmission pin 22 includes a second positive pin 221 and a second negative pin 222. The second positive pin 221 is connected to the second anode 121, and the second negative pin 222 is connected to the second cathode 122.

In the first embodiment, referring to FIG. 1, the second anode 121 and the second cathode 122 of the data transmission port 12 can be connected to an anode and a cathode of a first data storage device 123 correspondingly, and data information can be input to or output from the first data storage device 123 via the second anode 121 and the second cathode 122. The second positive pin 221 and the second negative pin 222 of the data transmission pin 22 can be connected to an anode and a cathode of a second data storage device 223 correspondingly. The second anode 121 and the second cathode 122 of the data transmission port 12 can be connected to the anode and cathode of the second data storage device 223 via the second positive pin 221 and the second negative pin 222, so that the second anode 121 and the second cathode 122 are enabled to be connected to the second data storage device 223, thus the first data storage device 123 is connected to the second data storage device 223 via the second anode 121 and the second cathode 122, thereby realizing data interaction between the first data storage device 123 and the second data storage device 223. It is to be understood that the first data storage device 123 may be a terminal, such as a mobile phone, a tablet computer, an electronic reader, and so on. The second positive pin 221 and the second negative pin 222 may be a DATA+ pin and a DATA− pin of the USB interface respectively. The second data storage device 223 may be a computer hard disk, or a flash memory device, or a mobile hard disk. In other embodiments, the first data storage device may be a mobile hard disk, a flash memory device, a notebook computer hard disk, or the like, and the second data storage device may be a mobile phone, a tablet computer, an electronic reader, and the like.

Furthermore, the instruction transmission port 13 includes at least one static contact, and the instruction triggering port 23 includes at least one movable contact. After the press element 20 is pressed towards the connecting element 20, the movable contact comes into contact with the static contact, so as to trigger transmission of one or more instructions.

In the first embodiment, referring to FIG. 1, the instruction transmission port 13 includes a first static contact 131, and the instruction triggering port 23 includes a first movable contact 231. The first static contact 131 is arranged on an end of the instruction transmission circuit of the connecting element 10. The first movable contact 231 is connected to another end of the instruction transmission circuit of the connecting element 10 via a conductor (not indicated). The closing of the instruction transmission circuit can be realized when the first movable contact 231 comes into contact with the first static contact 131, such that a pulse signal is generated, and the instruction transmission port 13 transmits an instruction. It is to be understood that the press element 10 can generate an instruction for turning on or turning off the power source.

A second embodiment is provided. Referring to FIG. 2, the first anode 111 and the first cathode 112 can be connected to an anode and a cathode of a power supply device 113a correspondingly. Current can be acquired from the power supply device 113a via the first anode 111 and the first cathode 112. The first positive pin 211 and the first negative pin 212 of the current transmission pin 21 can be connected to the anode and cathode of a power consumption device 213a correspondingly. The first anode 111 and the first cathode 112 of the current transmission port 11 are connected to the anode and cathode of the power consumption device 213a correspondingly via the first positive pin 211 and the first negative pin 212, so that the first anode 111 and the first cathode 112 are connected to the power consumption device 213a, thus the electricity of the power supply device 113a can be transmitted to the power consumption device 213a via the first anode 111 and the first cathode 112. It is to be understood that the power supply device 113a may be a mobile power pack, a mobile phone with a mobile power pack function, a battery assembly, a power socket connected to a power grid, or the like. The first positive pin 211 and the first negative pin 212 may be a D+ and D− pin of the USB interface respectively. The power consumption device 213a may be an electronic device, such as a mobile phone, a tablet computer, an electronic photo album, an electronic reader, and so on. In other embodiments, the current transmission pin 21 may also include a ground pin, the current transmission port 11 may also include a ground electrode, and the ground electrode is electrically connected to the ground pin.

In the second embodiment, referring to FIG. 2, the instruction transmission port 13 includes two first static contacts 131, and the instruction triggering port 23 includes two first movable contacts 231. The two first static contacts 131 are arranged on two ends of the instruction transmission circuit. The two first movable contacts 231 are arranged on two ends of a conductor. The conductor is fixed to an end of the press element 20, and the end of the press element 20 is adjacent to the connecting element 10. After the press element 20 is pressed towards the connecting element 10, the two first movable contacts 231 come into contact with the two first static contacts 131 correspondingly, so as to close the instruction transmission circuit, and trigger the instruction transmission circuit to generate a pulse signal, thus the instruction transmission port 13 transmits an instruction.

A third embodiment is provided. Referring to FIG. 3, the instruction transmission port 13 includes a first static contact 131 and a second static contact 132. The instruction triggering port 23 includes a first movable contact 231 and a second movable contact 232. The first static contact 131 is arranged on an end of a first instruction transmission circuit of the connecting element 10, and the second static contact 132 is arranged on an end of a second instruction transmission circuit of the connecting element 10. The first movable contact 231 is connected to another end of the first instruction transmission circuit via a first conductor (not indicated), and the second movable contact 232 is connected to another end of the second instruction transmission circuit via a second conductor (not indicated). After the press element 20 is pressed towards the connecting element 10, the first movable contact 231 comes into contact with the first static contact 131, so that the first instruction transmission circuit is closed, and the first instruction transmission circuit is triggered to generate a first pulse signal, thus the instruction transmission port 13 can transmit a first instruction. When the second movable contact 231 comes into contact with the second static contact 232, the second instruction transmission circuit is triggered to generate a second pulse signal, thus the instruction transmission port 13 can transmit a second instruction. The time point that the first movable contact 231 comes into contact with the first static contact 131 may be the same as or different from that the second movable contact 232 comes into contact with the second static contact 132. It is to be understood that the press element 10 may be a volume button of a terminal. The volume is controlled to be increased via the first instruction, and the volume is controlled to be reduced via the second instruction. Or the press element 10 may be a brightness button of a terminal.

Figure 4:
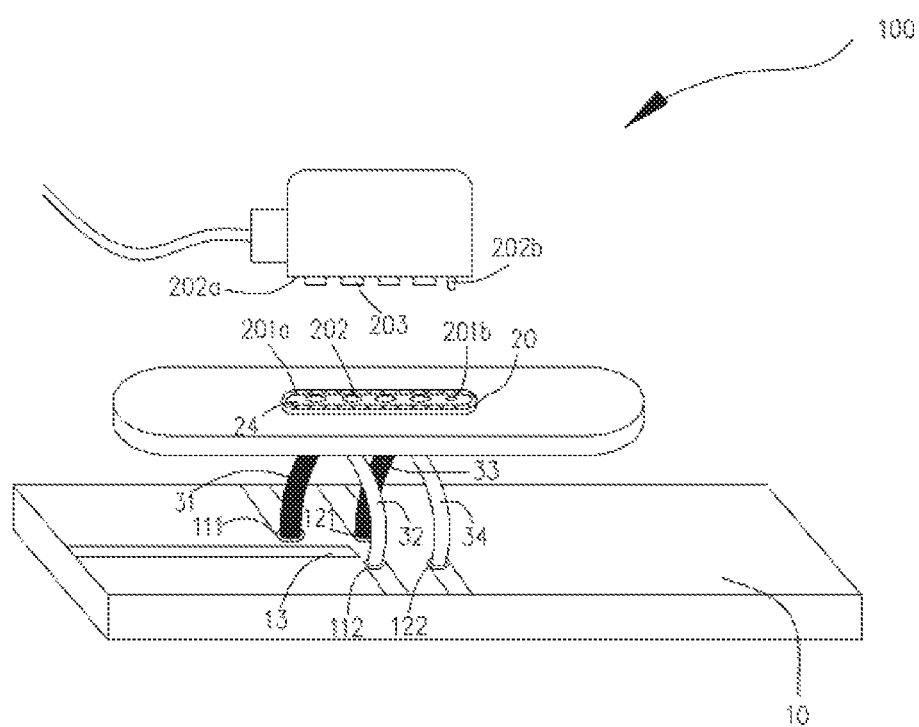
FIG. 4 is a perspective view of the button structure of the first embodiment illustrated in FIG. 1.

Furthermore, in the first embodiment, referring to FIG. 1 and FIG. 4, the at least one elastic element 30 includes a first conductive shrapnel 31 and a second conductive shrapnel 32. The first conductive shrapnel 31 is connected to the first anode 111 and the first positive pin 211, and the second conductive shrapnel 32 is connected to the first cathode 112 and the first negative pin 212. The at least one elastic element 30 further includes a third conductive shrapnel 33 and a fourth conductive shrapnel 34. The third conductive shrapnel 33 is connected to the second anode 121 and the second positive pin 221, and the fourth conductive shrapnel 33 is connected to the second cathode 122 and the second negative pin 222.

In the embodiment, the first conductive shrapnel 31 is made of metal material. The first conductive shrapnel 31 can provide the connecting element 10 and the press element 20 with an elastic restoring force, and also can be a conductor between the first anode 111 and the first conductive pin 211, so as to realize electrical connection between the first anode 111 and the first positive pin 211, that is, the conductor between the first anode 111 and the first positive pin 211 may be arranged on the elastic element 30. The structure of the second conductive shrapnel 32, the third conductive shrapnel 33, and the fourth conductive shrapnel 34 is the same as that of the first conductive shrapnel 31, which will not be repeated herein. In other embodiments, if the connecting element 10 of the button structure 100 includes only the current transmission port 11 and the instruction transmission port 13, or only the data transmission port 12 and the instruction transmission port 13, the at least one elastic element may also include only the first conductive shrapnel and the second conductive shrapnel, or only the third conductive shrapnel and the fourth conductive shrapnel.

In the second embodiment, referring to FIG. 2, the at least one elastic element 30 includes a first elastic element 311. The first elastic element 311 is a rectangular spring, and two ends of the first elastic element 311 are fixed to the connecting element 10 and the press element 20 respectively. The first anode 111 is connected to the first positive pin 211 via a first flexible cable 111*a*, and the first cathode 112 is connected to the first negative pin 212 via a second flexible cable 121*a*. The first flexible cable, the second flexible cable, and the first elastic element 311 are arranged to be insulated from each other.

In the third embodiment, referring to FIG. 3, the at least one elastic element 30 includes a first rubber pad 311*a* and a second rubber pad 312*a*. The first rubber pad 311*a* and the second rubber pad 312*a* are both fixed between the connecting element 10 and the press element 20. The first rubber pad 311*a* is adjacent to the first movable contact 231, and is configured to provide a restoring force to cause the first movable contact 231 to get away from the first static contact 131. The second rubber pad 3112*a* is adjacent to the second movable contact 232, and is configured to provide a restoring force to cause the second movable contact 232 to get away from the second static contact 132. Thus, the press element 10 can be enabled to operate the first movable contact 231 and the second movable contact 232 separately.

Figure 5:
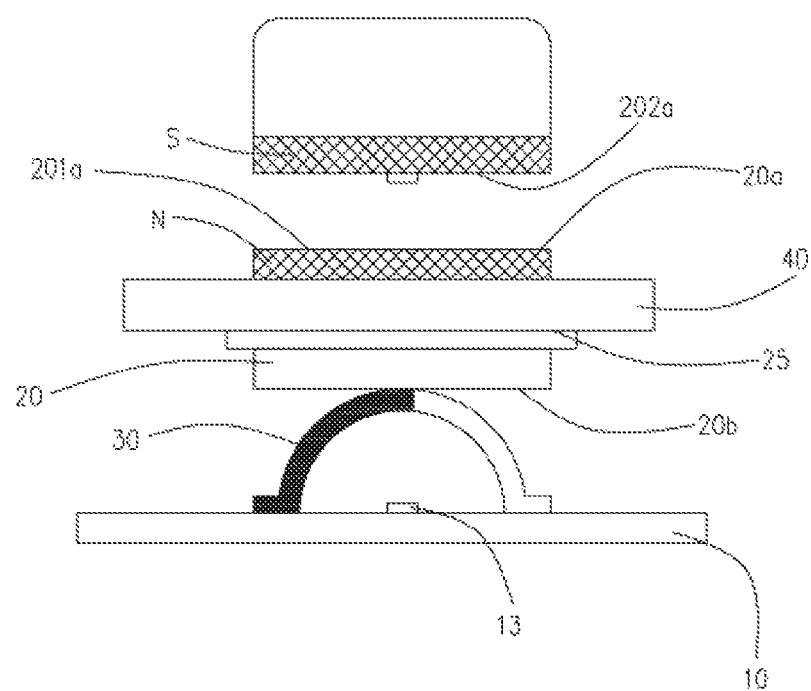
FIG. 5 is a side view showing the button structure of FIG. 4 in a first operating state.

Furthermore, referring to FIG. 1, FIG. 4, and FIG. 5, the press element 20 includes a front surface 20*a* and a rear surface 20*b* opposite to the front surface 20*a*. The rear surface 20*b* faces the connecting element 10. The front surface 20*a* is provided with a first insertion portion 201*a*. At least one of the current transmission pin 21 and the data transmission pin 22 extends from the rear surface 20*b* to the front surface 20*a* to be electrically connected to at least one of the power source and the data source. At least one of the power source and the data source includes a second insertion portion 202*a*, and the second insertion portion 202*a* is connected to the first insertion portion 201*a*.

In the first embodiment, the press element 20 is a rectangular plate. The first insertion portion 201*a* is a flat surface, and the second insertion portion 202*a* is a flat surface. A first magnetic layer N is arranged on the first insertion portion 201, and a second magnetic layer S is arranged on the second insertion portion 202*a*. When the first insertion portion 201*a* gets close to the second insertion portion 202*a*, the first insertion portion 201*a* of the press element 20 and the second insertion portion 202*a* are magnetically attracted via the two magnetic layers. It is to be understood that the second insertion portion 202*a* is a plug of the power supply device or a plug of a data line.

In the embodiment, the front surface 20*a* of the press element 20 is provided with four jacks 202. The first positive pin 211, the first negative pin 212, the second positive pin 221, and the second negative pin 222 extend from the rear surface 20*b* into the four jacks 202 respectively. The first positive pin 211, the first negative pin 212, the second positive pin 221, and the second negative pin 222 are all hollow tubes. The second insertion portion 202*a* is provided with four insertion posts 203. The four insertion posts 203 are connection terminals of a cable. The four insertion posts 203 are inserted into the four jacks 202 correspondingly, so that the first positive pin 211, the first negative pin 212, the second positive pin 221 and the second negative pin 222 come into contact with the power source and the data source. Specifically, taking the first positive pin 211 as an example, an end surface of the first positive pin 211 away from the rear surface 20*b* may be flush with the front surface 20*a*, so that when the insertion post 203 is inserted into the first positive pin 211, the first positive pin 211 encapsulates the insertion post 203, thereby enlarging contact area of the first positive pin 211 and the insertion post 203, thus the conductivity of the first positive pin 211 and the insertion post 203 is much better. The structure of the first negative pin 212, the second positive pin 221, and the second negative pin 222 is the same as that of the first positive pin 221, which will not be repeated herein. In other embodiments, the first positive pin 211, the first negative pin 212, the second positive pin 221, and the second negative pin 222 can also be posts. End surfaces of the first positive pin 211, the first negative pin 212, the second positive pin 221, and the second negative pin 222 away from the rear surface 20*b* may all be arranged in the jacks 202.

In the embodiment, the front surface 20*a* is provided with a first positioning portion 201*b*. At least one of the power source and the data source includes a second positioning portion 202*b*. The second positioning portion 202*b* is fixedly connected to the second insertion portion 202a. The second positioning portion 202b matches with the first positioning portion 201b to position the first insertion portion 201a to the second insertion portion 202a. Specifically, the first positioning portion 201b is an insertion slot, and the second positioning portion 202b is a boss. In other embodiments, the first positioning portion 201 may also be a positioning post, and the second positioning portion may also be a positioning hole.

In the embodiment, the press element 20 has an insulation layer 24. The current transmission port 11 and the data transmission port 12 are insulated from each other via the insulation layer 24. Specifically, the insulation layer 24 encapsulates peripheral sides of the first positive pin 211, the first negative pin 212, the second positive pin 221, and the second negative pin 222. The first magnetic layer N encapsulates the insulation layer 24.

In the embodiment, the button structure 100 may include three usage states. Referring to FIG. 5, the button structure 100 is in a first usage state. The second insertion portion 202a is not inserted into the first insertion portion 201 of the press element 20, and the button structure 100 cannot transmit electricity and data. However, the press element 20 can be pressed to transmit an instruction, that is, an operation of turning on or turning off a power source can be realized, or a startup or shutdown operation can be realized.

Figure 6:
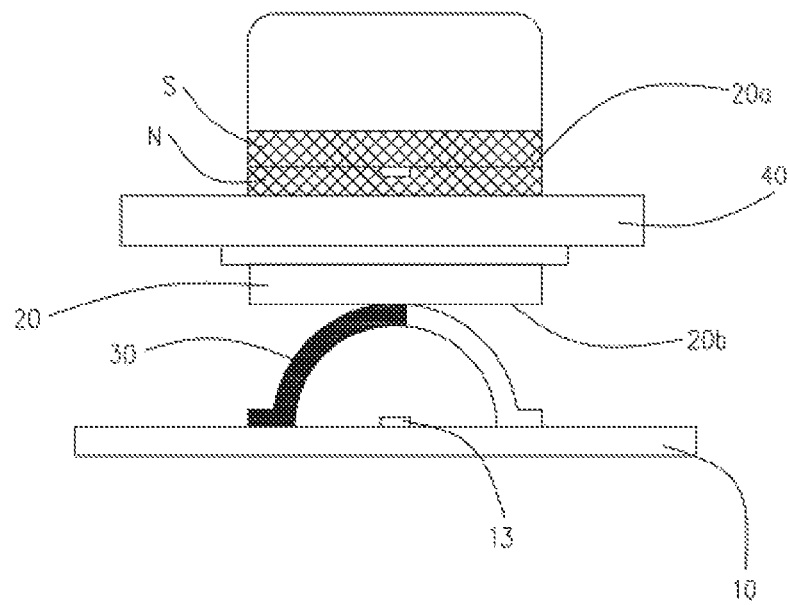
FIG. 6 is a side view showing the button structure of FIG. 4 in a second operating state.

Referring to FIG. 6, the second insertion portion 202a is inserted into the first insertion portion 201a of the press element 20, and the button structure 100 can transmit electricity or data.

Figure 7:
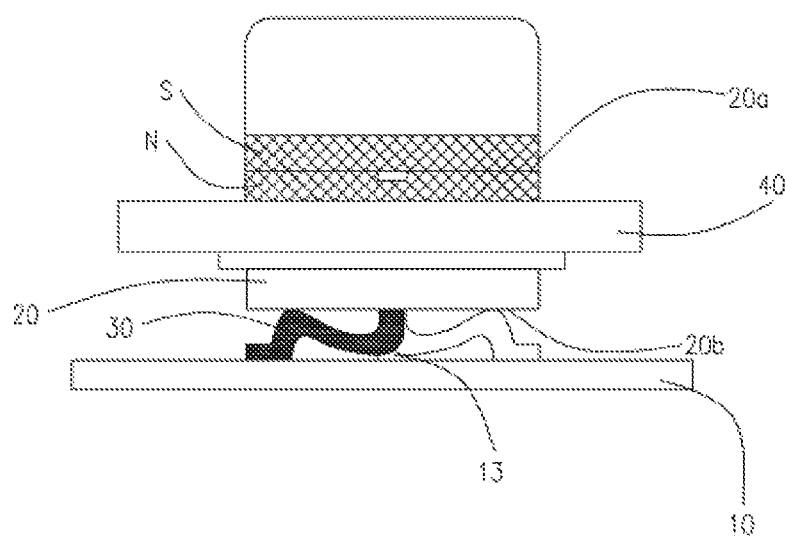
FIG. 7 is a side view showing the button structure of FIG. 4 in a third operating state.

Referring to FIG. 7, the second insertion portion 202a is inserted into the first insertion portion 201a of the press element 20, meanwhile, the press element 20 gets close to the connecting element 10, triggering the instruction transmission port 13 to transmit an instruction. That is, by means of the button structure 100, data transmission and charging can be realized, and also an operation of turning on or turning off the power source, or a startup or shutdown operation can be also realized.

In the second embodiment, the first insertion portion 201 is an insertion slot, and the second insertion portion 202a is a boss. For example, the first insertion portion 201a may be a standard USB socket (not indicated), and the second insertion portion 202a may be a standard USB plug (not indicated).

Figure 8:
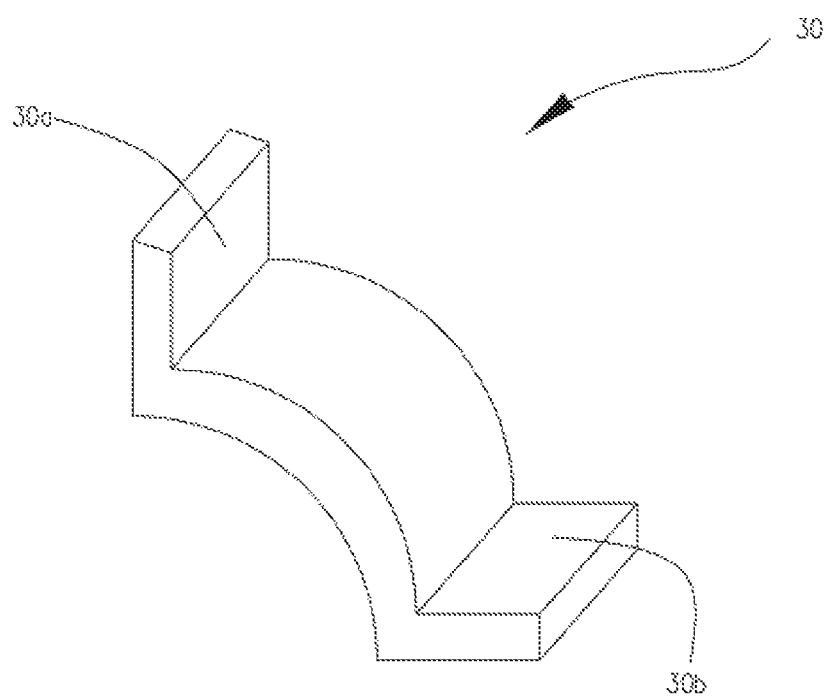
FIG. 8 is a schematic view of an elastic element of the button structure of FIG. 4.

Furthermore, in the first embodiment, referring to FIG. 8, the elastic element 30 is an arc-shaped bent rod. The elastic element 30 includes a first end 30a fixed to the press element 20, and a second end 30b fixed to the connecting element 10. Two elastic elements 30 may be included. The second end 30b of each elastic element 30 is arranged along a straight line, the second ends 30b of the two elastic elements 30 are arranged in staggered manner, and distributed at two sides of the instruction transmission port 13. The first end 30a of the elastic element 30 is cylindrical. Alternatively, four elastic elements 30 may be included. The four first ends 30a of the four elastic elements 30 are integrally formed with the first positive pin 211, the first negative pin 212, the second positive pin 221, and the second negative pin 222 respectively, so that the elastic elements 30 can provide the press element 20 with an elastic force. The second end 30b of each elastic element 30 is a straight plate, and the four second ends 30b of the elastic elements 30 are fixedly connected to the first anode 111, the first cathode 112, the second anode 121, and the second cathode 122 of the connecting element 10 correspondingly and respectively.

Figure 9:
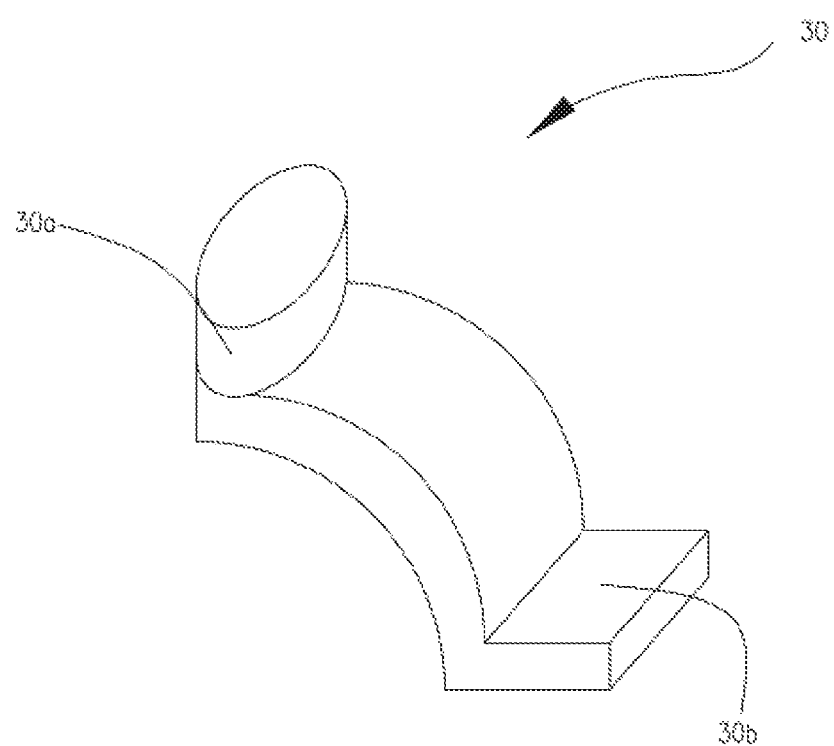
FIG. 9 is a schematic view showing a first improvement manner of an elastic element of the button structure of FIG. 4.

In a first improved manner of the first embodiment, referring to FIG. 9, the first end 30a of the elastic element 30 is in a plug shape. The first end 30a of the elastic element 30 can be inserted into the press element 20, thus it is easy to replace the elastic element 30.

Figure 10:
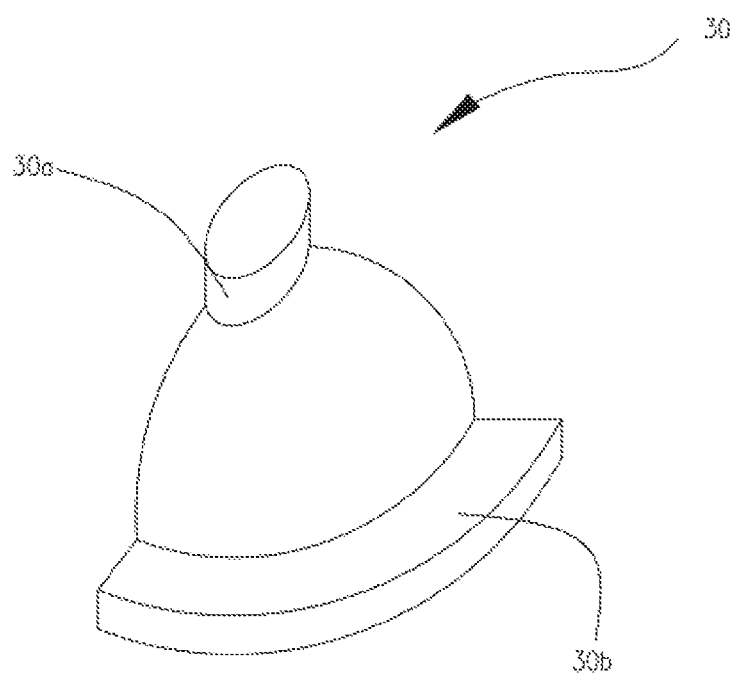
FIG. 10 is a schematic view showing a second improvement manner of an elastic element of the button structure of FIG. 4.

In a second improved manner of the first embodiment, referring to FIG. 10, the elastic element 30 is one eighth of a spherical shell, the first end 30a is cylindrical, and the second end 30b is a quarter of a circular ring. The second end 30b is arranged to surround the axis of the first end 30a. Between the first end 30a and the second end 30b, one eighth of a spherical thin sidewall exists. The structure of the second end 30b is more stable than the first end 30a, thereby prolonging the service life of the elastic element 30.

Figure 11:
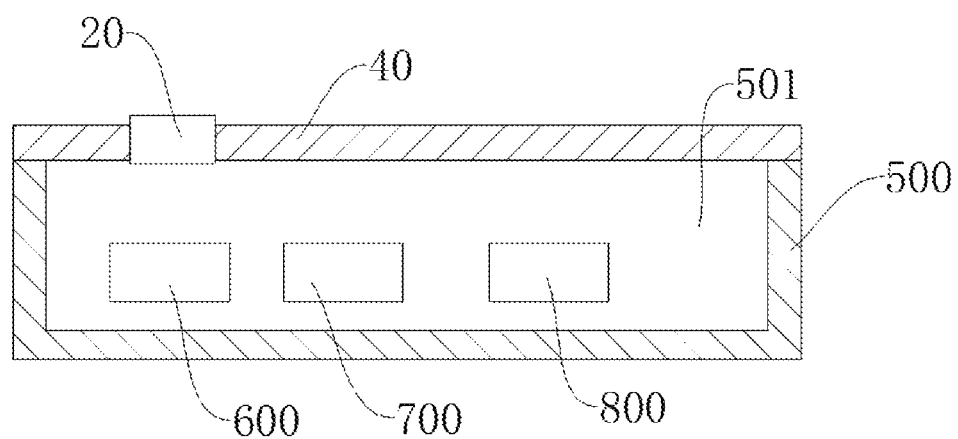
FIG. 11 is a sectional view of a terminal according to an embodiment of the present disclosure.

Referring to FIG. 11, the present disclosure also provides a terminal. The terminal includes the button structure 100 and a housing 500. The housing 500 defines a receiving cavity 501. The connecting element 10 is fixed in the receiving cavity 501. The press element 20 is exposed out of the receiving cavity 501. It is to be understood that, the terminal may be a mobile phone, a tablet computer, an electronic book reader, and so on. The housing 500 is a shell of the terminal. The receiving cavity 501 can receive an antenna, a chip, a storage card, a battery of the terminal, and so on. The connecting element 10 may be electrically connected to the antenna, the chip, the storage card, the battery, and the like, and transmit data and/or electricity, and transmit instructions. When the press element 20 is pressed towards the receiving cavity 501, instruction triggering can be realized.

Furthermore, the terminal also includes a cover plate 40 to seal the receiving cavity 501. The connecting element 10 is arranged with respect to the cover plate 40. The press element 20 is fixed to the cover plate 40. The cover plate 40 is deformable adjacent to the connecting element 10. The cover plate 40 may be hermetically connected to the press element 20. The cover plate 30 is provided with through holes (not indicated). Latching portions 25 (see FIG. 5) are provided in the peripheral sides of the press element 20. The latching portions 25 are engaged with the through holes, so that the press element 20 is hermetically connected to the cover plate 40, and the press element 20 can be further hermetically connected to the housing 500, thereby realizing the purpose of dustproof and waterproof when realizing pressing, thus the service life of the terminal is prolonged.

The terminal further includes at least one of a power storage device 600 and a data storage device 700, and an instruction processing device 800. The current transmission port 11 is electrically connected to the power storage device 600, the data transmission port 12 is electrically connected to the data storage device 700, and the instruction transmission port 13 is electrically connected to the instruction processing device 800. It is to be understood that, when the terminal is a mobile phone, the power storage device 600 may be a rechargeable battery which may be recycled. The data storage device 700 may be a memory card, or a secure digital memory card. The instruction processing device 800 may be a central processing unit (CPU).

In the present disclosure, the button structure and the terminal using the same can realize the current output or input function via the electrical connection between the current transmission pin of the press element and the current transmission port of the connecting element, realize the data output or input function via the electrical connection between the data transmission pin of the press element and the data transmission port of the connecting element. Also, when the press element is pressed towards the connecting element, the instruction triggering port comes into contact with the instruction transmission port to realize instruction transmission function, so that the button structure can meet the requirements of various functions.

The foregoing descriptions are preferred implementation manners of the present disclosure. It should be noted that a person of ordinary skill in the art may further make some improvements and modifications without departing from the principle of the present disclosure, and the improvements and modifications should also be construed as falling within the protection scope of the present disclosure.

What is claimed is:

1. A terminal, comprising:
a button structure, comprising:
a connecting element;
a press element; and
at least one elastic element connected to the connecting element and the press element, wherein the at least one elastic element is operable to provide a restoring force after the press element is pressed towards the connecting element;
wherein the connecting element is provided with an instruction transmission port and at least one of a current transmission port and a data transmission port; the press element is provided with an instruction triggering port and at least one of a current transmission pin and a data transmission pin; the current transmission pin is electrically connected to the current transmission port to output or input current; the data transmission pin is electrically connected to the data transmission port to output or input data; when the press element is pressed towards the connecting element, the instruction triggering port comes into contact with the instruction transmission port to trigger instruction transmission;
wherein the terminal further comprises a housing, the housing defines a receiving cavity, the connecting element is fixed in the receiving cavity, and the press element is exposed out of the receiving cavity;
wherein the current transmission port comprises a first anode and a first cathode, the current transmission pin comprises a first positive pin and a first negative pin, the first positive pin is connected to the first anode, and the first negative pin is connected to the first cathode;
wherein the at least one elastic element comprises a first conductive shrapnel and a second conductive shrapnel, the first conductive shrapnel is connected to the first anode and the first positive pin, and the second conductive shrapnel is connected to the first cathode and the first negative pin.

2. The terminal of claim 1, wherein the terminal further comprises an instruction processing device and at least one of a power storage device and a data storage device, the current transmission port is electrically connected to the power storage device, the data transmission port is electrically connected to the data storage device, and the instruction transmission port is electrically connected to the instruction processing device.

3. The terminal of claim 1, wherein the data transmission port comprises a second anode and a second cathode, the data transmission pin comprises a second positive pin and a second negative pin, the second positive pin is connected to the second anode, and the second negative pin is connected to the second cathode.

4. The terminal of claim 3, wherein the at least one elastic element further comprises a third conductive shrapnel and a fourth conductive shrapnel, the third conductive shrapnel is connected to the second anode and the second positive pin, and the fourth conductive shrapnel is connected to the second cathode and the second negative pin.

5. The terminal of claim 1, wherein the instruction transmission port comprises at least one static contact, the instruction triggering port comprises at least one movable contact, after the press element is pressed towards the connecting element, the movable contact comes into contact with the static contact to trigger transmission of two different instructions.

* * * * *